(12) United States Patent
Forde

(10) Patent No.: US 6,819,711 B1
(45) Date of Patent: Nov. 16, 2004

(54) COMMUNICATION CHANNEL QUALITY INDICATOR

(75) Inventor: Brian J. Forde, Dublin (IE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/501,897

(22) Filed: Feb. 10, 2000

(30) Foreign Application Priority Data

Feb. 26, 1999 (GB) .............................. 9904351

(51) Int. Cl.[7] .......................... H04B 17/00; H04B 3/46; H04Q 1/20
(52) U.S. Cl. ...................... 375/224; 375/227; 375/316
(58) Field of Search ................................ 375/224, 297, 375/316–352, 227; 370/449; 714/807, 748; 340/506, 635

(56) References Cited

U.S. PATENT DOCUMENTS

| 4,833,672 A | 5/1989 | Steely ........................ 370/85 |
| 5,271,011 A | 12/1993 | McMullan, Jr. et al. ..... 371/5.3 |
| 5,598,431 A * | 1/1997 | Lobel ......................... 375/224 |
| 5,636,230 A * | 6/1997 | Marturano et al. ......... 714/748 |

FOREIGN PATENT DOCUMENTS

| EP | 0599515 A1 * | 1/1994 | ............. H04L/1/20 |
| EP | 0599515 A1 | 6/1994 | ............. H04L/1/20 |
| WO | 9620548 | 7/1996 | ........... H04L/12/26 |

* cited by examiner

Primary Examiner—Stephen Chin
Assistant Examiner—Curtis Odom
(74) Attorney, Agent, or Firm—Dicran Halajian

(57) ABSTRACT

The quality of a communications channel carrying data packets is determined by establishing if a packet is received correctly or incorrectly. Check means provides a signal to a microprocessor for each correct reception event and each incorrect reception event. A value, held in a two byte counter is indicative of the quality of the communications channel. For each correct reception event the value of the counter is decreased by an extent dependent on the value already held in the counter. For each incorrect reception the value of the counter is increased by an extent dependent on the value already held in the counter. When the stored counter value exceeds a preset threshold value indicating poor channel quality, a comparator produces an output signal to initiate a handover operation to another communications channel.

34 Claims, 2 Drawing Sheets

COMMUNICATION CHANNEL QUALITY INDICATOR

The present invention relates to a method and apparatus for determining quality indicators for communication channels. In particular the present invention relates to determining whether individual channels of a communications system should be used for the communication of information.

In communication systems information is transferred over communication channels established on various types of communication links. The quality of these links affects the performance of the communication channels and the quality can be specified in a number of ways. One way to determine the quality of a communication channel, especially where information is digital and transferred in packets, is to take account of the number of successful and unsuccessful (failed) reception events for information carried along the communication channel. The exact manner of detecting successful or unsuccessful receptions can vary, but one way is to include error checking information with transmitted packets so that a determination may be made at the receiving side as to whether the received packets have been received correctly.

Communication links are likely to be subject to interference from time to time and intermittent reception failures will occur. Reception failures may be a particular problem where the communication link is a radio link, for example, in a cellular communication system between a mobile terminal and a fixed terminal.

Systems that use wireless links can often establish such links on a number of different system channels. If the system is a cellular system the links can be established with different radio end points. In such systems it is beneficial to monitor the quality of a wireless link that has already been established because if it is unsatisfactory, a different wireless link can be set up on a different system channel and/or to a different radio end point that will provide a superior quality wireless link and therefore a superior quality communications channel.

Intermittent reception failures are to be expected and although they are undesirable, they may not present any serious problems and are not necessarily an indication that the channel quality is poor. Conversely, periodic repeating reception failures or high levels of random reception failures are an indication that channel quality is inferior and may cause problems such as a reduction in communication channel bandwidth.

It is therefore necessary to monitor the quality of a communication link to obtain an indication of whether it is suitable for supporting a communication channel. The indication should account for the fact that a single packet failure by itself does not determine that the channel is of poor quality. However, periodic packet reception failures or high levels of random packet reception failures should be reflected in the indication because such failures do indicate a poor quality link.

In order to obtain an indication of this type, a history of link quality based on the number of communication channel packet reception successes and failures can be used to determine the link quality.

A simple approach for doing this is to use a counter which is incremented each time a packet is received correctly and decremented each time a packet is received incorrectly. A similar type of counter is mentioned in U.S. Pat. No. 5,271,011, which relates to a digital audio muting system for disabling the output of a data transmission system when a relatively high error rate is detected. The counter of the muting system is incremented when an error is detected and decremented by an amount at a programmable time interval. The counter may be incremented by a greater amount when more serious errors are detected. A threshold value can then be established for comparing to the value held in the counter. If the value held in the counter is larger than the threshold value, the quality can be deemed to be bad; if the value held in the counter is smaller than the threshold value, the quality can be deemed to be good.

However, this approach does not take account of the time at which packet reception fails. For example, if a regular periodic failure were to occur for every fifth packet transmitted, the quality of the communications channel is poor, due to interference of the communications link. Such a simple counter may not reflect this, even if a packet reception failure is given more weight than the packet reception success. In fact, for any counter which adds a first value for packet reception failure and subtracts a second value for packet reception success, the resulting value of the counter will decrease continuously (tend towards zero) in the presence of periodic or random errors, where the average error ratio is less than the first value divided by the sum of the first and second values. Similarly, the resulting value of the counter will increase continuously (tend towards the maximum value of the counter) in the presence of periodic or random errors, where the average error ratio is greater than the first value divided by the sum of the first and second values.

SUMMARY OF THE INVENTION

It is an object of the present invention to provide a mechanism for reliably evaluating the quality or average error ratio of a communications channel based on the number of packets that are transferred over the channel either successfully or unsuccessfully.

It is another object of the present invention that the mechanism should not place an undue burden on system resources in terms of processing or storage capacity requirements.

In accordance with the first aspect of the present invention there is provided apparatus for determining the quality of a communications channel carrying information units for reception, the apparatus having:

input means for receiving information identifying if correct or incorrect reception of transmissions on the communications channel occurred;

storage means for storing data indicative of the quality of the communications channel; and update means coupled with the input means for performing a first update operation to update the stored data in the event of incorrect reception of information units and for performing a second update operation to update the stored data in the event of correct reception of information units, wherein the stored data is updated to an extent dependent on the data stored by the storage means immediately before the occurrence of the event.

Because the stored data is updated to an extent dependent on the data stored before the event, the data stored in the updated form will reflect the history of the stored data. Because the history is reflected, incorrect reception events in the form of intermittent single packet failures will not dominate the stored data. However, a plurality of incorrect reception events in the form of repetitive periodic or high levels of random packet failures will begin to affect the stored data. Advantageously, because the history of the stored data is considered, more recent incorrect reception events can affect the stored data to a greater extent than incorrect reception events that occurred sometime ago. This means that the use of a quality history can be made to weigh more recent packet reception failures in favor of reception failures that occurred some time ago.

Preferably the stored data includes a value, the first update operation increases the stored value and the second update operation decreases the stored value, such that the value stored by the storage means increases or decreases with each operation by an amount dependent on the value stored immediately before the occurrence of the event. Alternatively, the first update operation may decrease the stored value and the second update operation increase the stored value, such that the value stored by the storage means decreases or increases with each operation by an amount dependent on the value stored immediately before the occurrence of the event.

The storage means may include a two byte counter for holding a value indicative of the quality of the communications channel. If the stored data includes a value and the first update operation increases the stored value for each event of incorrect reception, the counter may be incremented by a value obtained by subtracting the value that is held in the high byte of the counter immediately before the event from 128 decimal.

If the stored data includes the value and the second update operation decreases the stored value for each event of correct reception, the counter may be decremented by a value obtained by subtracting the value that is held in the high byte of the counter immediately before the event.

If the data does include a value, the quality of the communications channel may be determined by comparing the stored value of the storage means with a predetermined threshold value and determining the quality from the difference therebetween.

In accordance with a second aspect of the present invention there is provided a method for determining the quality of a communications channel carrying information units for reception, said method comprising the steps of:

monitoring if correct reception of information transferred by the communications channel occurred;

storing data indicative of the quality of the communications channel; and performing a first update operation to update the stored data in the event of incorrect reception of information units otherwise performing a second update operation to update the stored data in the event of correct reception of information units, wherein the stored data is updated to an extent dependent on the data stored immediately before the occurrence of the event.

Other aspects and optional features of the present invention appear in the appended claims, to which reference should now be made and the disclosure of which is incorporated herein by reference.

BRIEF DESCRIPTION OF THE DRAWINGS

Embodiments of the present invention will now be described with reference to the accompanying drawings in which.

DETAILED DESCRIPTION OF THE INVENTION

Figure 1:
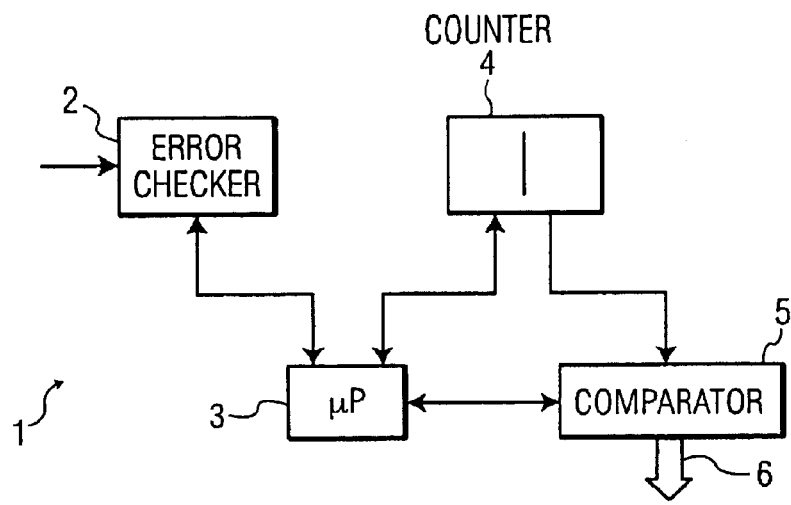
FIG. 1 shows a functional representation of apparatus suitable to implement the present invention.

Referring to FIG. 1 apparatus 1 embodying the present invention is provided with error checking means 2 for evaluating information units in the form of data packets received over a communications channel. The error checking means establishes if a given data packet is received successfully indicating a correct reception event or unsuccessfully indicating an incorrect reception event. In this specific example a communications channel is established on a bearer of a DECT (Digital European Cordless Telephone) compliant telecommunications system in which case the determination that incorrect reception occurred may be made by taking into account the S-field, A-field cyclic redundancy checks (A-CRC), X-CRC and Z-field. Where B-field protected data is being transmitted, the B-CRCs can also be used. Additionally, in the case of traffic bearers, the Q1 and Q2 bits of the received packet can be used, all of which checks will be understood by the person skilled in the art. Other types of checks to test for correct reception of data packets could be performed if other communication systems are used as will also be apparent to the person skilled in the art.

As such correct and incorrect reception events are determined by checking means 2 this information is provided to a microprocessor 3 for updating a value held in a two byte counter 4 by an amount that depends on the value already held in the counter. For each determined packet reception failure (incorrect reception event) the counter 4 is incremented, under the control of the microprocessor 3, by a value of 128 decimal (80 hex) minus the high byte of the current value of the counter. For each determined packet reception success (correct reception event) the counter 4 is decremented, under the control of the microprocessor 3, by the high byte of the current value of the counter. This particular algorithm could be implemented with the following code:

```
if (reception successful)
{
    qualityCounter =- (qualityCounter / 256);
}
else
{
    qualityCounter =- (qualityCounter / 256) - 0x80;
}
```

In effect this solution is an infinite impulse response filter, with the input being a step function switching between 0 (for each successful reception event) and 80(hex), which is 128 in decimal, for an unsuccessful reception event.

The counter could be increased or decreased by different amounts depending on the required performance.

An indication of the quality of the communication channel is obtained by examining the value of the high byte of the counter. A first predefined threshold value could be set such that when the value of the high byte exceeds the threshold value the quality of the communication channel is determined to be bad. A second predetermined threshold, having a value which is the same as the first threshold value or less than the first threshold value could be set such that when the value of the high byte is below the threshold value the quality of the communications channel is determined to be good.

In those cases where the value of the counter is decreased for incorrect reception events and increased for correct reception events, the quality of the communications channel will be determined to be good when the value of the high byte exceeds the first threshold value and is determined to be bad when the value of the high byte is less than the second threshold value.

Threshold values may be altered depending on the implementation of the apparatus and indeed in some applications it may be preferable to dynamically alter the or each threshold value. Different levels of quality may be acceptable for voice and data applications, although the maximum level of quality attainable (i.e. the minimum error ratio) should be achieved if possible.

The examining of the value of the counter 4 is performed by comparator which produces a status output 6 indicating if the quality of the communications channel is good or bad.

If the apparatus is used in communications systems (optimally contained within a portable handset) that uses one or more of a number of different system channels for establishing the communications channel, the status output 6 may be used to initiate the communications system to select a different system channel than the one presently in use if the status output 6 indicates that the quality of the present communications channel is bad.

An example of such a system is a DECT compliant communications system where communication channels take the form of one or more bearers established between the portable part (portable terminal) and the fixed part (fixed terminal). If a bearer is determined to have poor quality as indicated by the status output 6, a handover attempt to a different bearer is initiated. In some cases, if the communications system is a cellular system, the handover of the communications channel may be to a different radio termination of the fixed terminal.

In one implementation the handover operation may proceed in co-operation with the mechanism described in our co-pending US patent application claiming priority from UK patent application number GB9 904 349.9, entitled 'Cellular Communication System Handover', the teaching of which is incorporated herein by reference. Furthermore, information relating to activity on the DECT compliant system channels may be monitored and stored as described in our co-pending US patent application entitled 'Wireless Communication Channel Management', claiming priority from UK patent application number GB 9 904 348.1 the teaching of which is also incorporated herein by reference.

Figure 2:
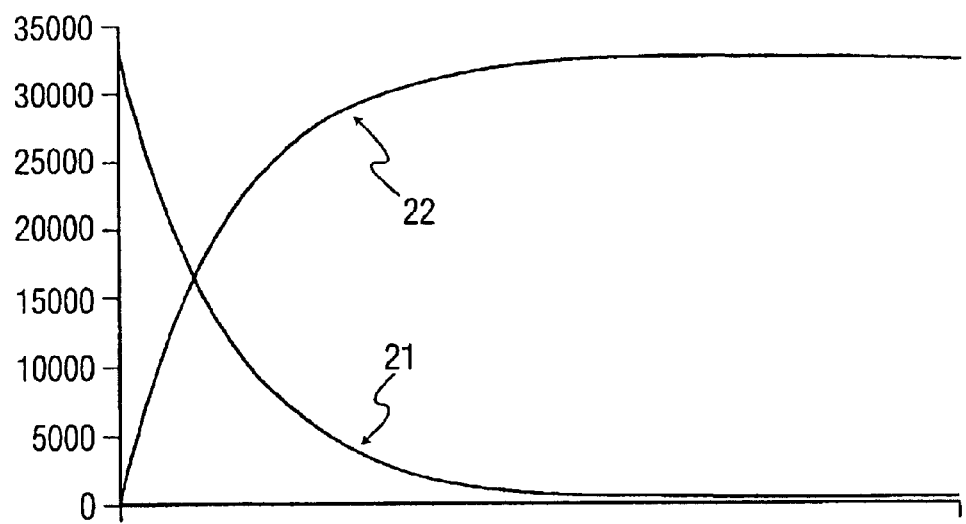
FIG. 2 shows a first example of the performance of a quality indicator of the present invention under a first set of conditions.

FIG. 2 is a graph which illustrates the general operation of the apparatus using a value to indicate the quality of a communications channel. The y-axis is used to indicate the value, with higher values indicating poor quality and lower values indicating better quality. The x-axis represents time and here it is assumed that reception events occur at regular periods, irrespective of the nature of the reception event. Line 21 plotted on the graph shows the quality value if every reception event over a long period is successful. Because every event is successful, the value should tend to zero in this example and it will be noted that whatever the starting value, the quality indicator tends to zero. Similarly line 22 plotted on the graph shows the quality value if reception events are normally unsuccessful. The quality indicator tends to a value representative of the actual quality so at any given level of quality, the graph shows how packet reception success or failure will affect the resulting value.

For example, at a low value of quality indicator, when the bearer quality is good, packet reception failure will cause a rapid increase in the value, while packet reception success has little or no effect. At the other extreme, where the quality indicator value is high, packet reception success has a greater influence on the result than packet reception failure.

Figure 3:
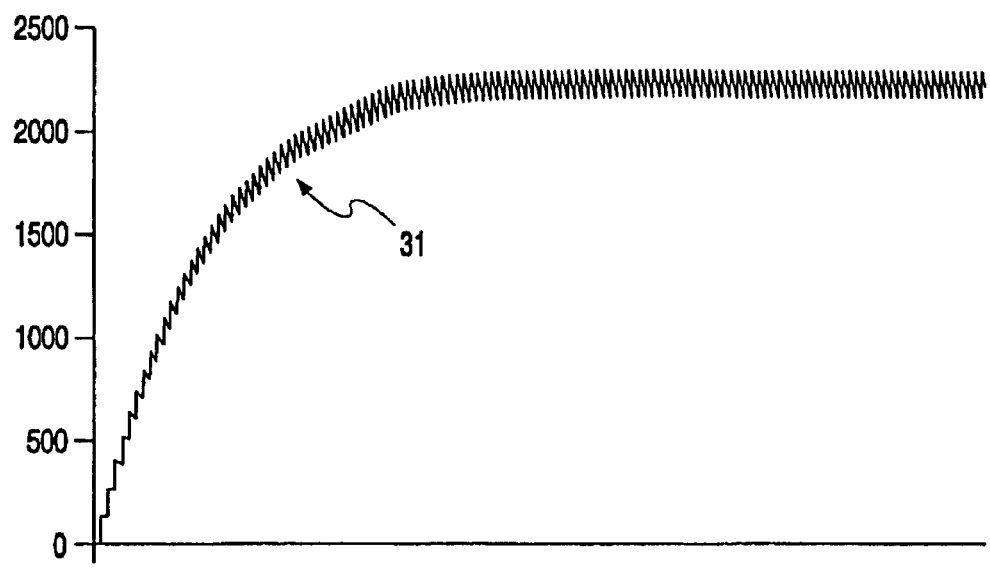
FIG. 3 shows a second example of the performance of a quality indicator of the present invention under a second set of conditions.

The graph shown in FIG. 3 has the same axes as the graph of FIG. 2, but the plot 31 shows the effect of regular reception failure on the quality indicator value. The quality indicator tends towards a value which reflects the frequency of packet failure. The example used to generate the graph assumes that every 16th packet reception fails.

Figure 4:
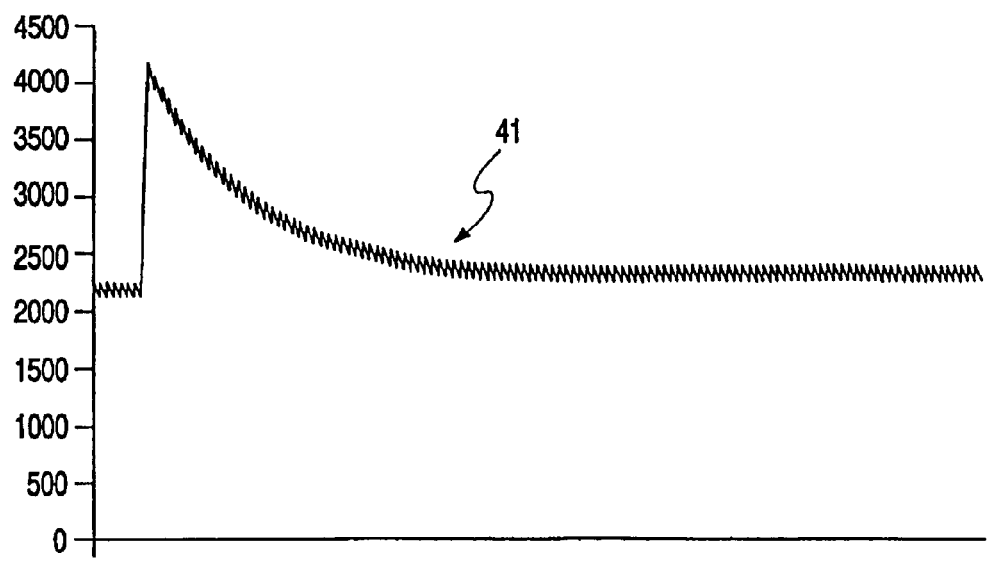
FIG. 4 shows a third example of the performance of a quality indicator of the present invention under a third set of conditions.

The graph of FIG. 4 contains a plot 41 which shows the effect of a burst failure (a series of packet reception failures) on the quality indicator value. The example used to generate this graph assumes that the underlying error rate is one where 1 in 16 packet receptions fail (as in FIG. 2). A burst error (of 16 packet reception failures) occurs, and thereafter the underlying error rate is restored.

It will be apparent to the person skilled in the art that other types of storage may be used, either instead of or in addition to a two byte counter. For example, the counter may store data in a different manner and it is not essential that the values stored bear similarity to values produced by an infinite impulse response filter. In any case it is desirable that the stored data should be maintained using a small amount of storage capacity with minimal processing requirements, as is the situation when a 2-byte counter is used.

One alternative example is where the storage means may include a counter for holding a value indicative of the quality of the communications channel. If the stored data includes a value and the first update operation increases the stored value for each event of incorrect reception, the counter may be incremented by a first fraction of the value obtained by subtracting the value that is held in the counter immediately before the event from the maximum value of the counter. Such a maximum value may be set as required but may be limited by the size of the counter. If the stored data includes the value and the second update operation decreases the stored value for each event of correct reception, the counter may be decremented by a second fraction of the value that is held in the counter immediately before the event. The size of the first fraction determines the rate at which the counter tends towards the maximum when an error occurs, and the size of the second fraction determines the rate at which the counter tends towards zero when successful reception occurs.

The opposite of this alternative example is where the stored value is increased as stated but for each event of correct reception and the stored value is decreased as stated but for each event of incorrect reception.

Where a two byte counter is used as described herein, for each event of incorrect reception the counter may be decremented by a value obtained by subtracting the value that is held in the high byte of the counter immediately before the event. For each event of correct reception the counter may be incremented by a value obtained by subtracting the value that is held in the high byte of the counter immediately before the event from 128.

Although the apparatus described is controlled by a microprocessor this is not a requirement as will also be apparent to the person skilled in the art.

From reading the present disclosure other modifications will be apparent to the person skilled in the art. Such modifications may involve other features which are already known in the design, manufacture and use of systems and devices and component parts thereof and which may be used instead of or in addition to already described herein.

What is claimed is:

1. Apparatus for determining quality of a communications channel carrying information units for reception, said apparatus having:
   input means for receiving information identifying if correct or incorrect reception of transmissions on the communications channel occurred;
   storage means for storing quality data indicative of the quality of the communications channel and
   update means coupled with said input means for performing a first update operation to update the quality data in a first event of incorrect reception of information units and for performing a second update operation to update the quality data in a second event of correct reception of information units;
   wherein the quality data is updated to an extent dependent on the quality data stored by the storage means immediately before the occurrence of one of said first event and said second event, so that more recent errors weigh more than errors that occurred earlier, and
   wherein the quality data includes a value, the first update operation increases the value and the second update operation decreases the value, such that the value stored by the storage means increases or decreases with each operation by an amount dependent on the value stored immediately before the occurrence of said one of said first event and said second event, and wherein the storage means includes a two byte counter and for each event of correct reception the counter is decremented by a value obtained by subtracting the value that is held in the high byte of the counter immediately before the event.

2. Apparatus for determining quality of a communications channel carrying information units for reception, said apparatus having:
   input means for receiving information identifying if correct or incorrect reception of transmissions on the communications channel occurred;
   storage means for storing quality data indicative of the quality of the communications channel; and
   update means coupled with said input means for performing a first update operation to update the quality data in a first event of incorrect reception of information units and for performing a second update operation to update the quality data in a second event of correct reception of information units,
   wherein the quality data is updated to an extent dependent on the quality data stored by the storage means immediately before the occurrence of one of said first event and said second event, so that more recent errors weigh more that errors that occurred earlier, and
   wherein the quality data includes a value, the first update operation increases the value and the second update operation decreases the value, such that the value stored by the storage means increases or decreases with each operation by an amount dependent on the value stored immediately before the occurrence of said one of said first event and said second event, and wherein the storage means includes a two byte counter and for each event of incorrect reception the counter is incremented by a value obtained by subtracting the value that is held in the high byte of the counter immediately before the event from 128 decimal.

3. Apparatus in accordance with claim 1 wherein the quality of the communications channel is determined by comparing the value stored in the storage means with a predetermined value and determining the quality from the difference therebetween.

4. Apparatus in accordance with claim 1, wherein the quality of the communications channel is determined by comparing the value stored in the storage means with a predetermined value and determining the quality from the difference therebetween.

5. Apparatus in accordance with claim 1, and further comprising comparator means wherein the quality of the communications channel is determined by comparing a high byte value of the two byte counter with a predetermined threshold value, wherein the channel quality is determined to be good when the value stored in the storage means is below a first predetermined threshold value otherwise the channel quality is determined to be poor when the value stored in the storage means is above a second predetermined threshold value.

6. Apparatus in accordance with claim 5 wherein the first and second threshold values are the same.

7. A wireless communications system including the apparatus of claim 1.

8. A digital European cordless telephone communications system including the apparatus of claim 1.

9. Apparatus in accordance with claim 1 wherein the value stored by the storage means maintains a value that is a function of a predetermined number of prior consecutive reception events.

10. A method for determining the quality of a communications channel carrying information units for reception, said method comprising the steps of:
    monitoring if correct reception of information transferred by the communications channel occurred;
    storing quality data indicative of the quality of the communications channel; and
    performing a first update operation to update the quality data in a first event of incorrect reception of information units otherwise performing a second update operation to update the quality data in a second event of correct reception of information units,
    wherein the quality data is updated to an extent dependent on the data stored immediately before the occurrence of one of said first event and said second event, and
    wherein the quality data includes a value stored in a two byte counter, the first update operation increases the value and the second update operation decreases the value, such that the value increases or decreases with each operation by an amount dependent on the value stored immediately before the occurrence of said one of said first event and said second event, and
    wherein the second update operation is performed by decrementing the value by an amount obtained by subtracting the value that is held in the high byte of the counter immediately before the second event.

11. A method for determining the quality of a communications channel carrying information units for reception, said method comprising the steps of:
    monitoring if correct reception of information transferred by the communications channel occurred;
    storing quality data indicative of the quality of the communications channel; and
    performing a first update operation to update the quality data in a first event of incorrect reception of information units otherwise performing a second update operation to update the quality data in a second event of correct reception of information units, wherein the quality data is updated to an extent dependent on the data stored immediately before the occurrence of one of said first event and said second event, and wherein the quality data includes a value stored in a two byte counter, the first update operation increases the value and the second update operation decreases the value, such that the value increases or decreases with each operation by an amount dependent on the value stored immediately before the occurrence of said one of said first event and said second event, and wherein the first update operation is performed by incrementing the value by an amount obtained by subtracting the value that is held in the high byte of the counter immediately before the first event from 128 decimal.

12. The apparatus of claim 1 wherein the information units are data packets.

13. The method of claim 10 wherein the information units are data packets.

14. Mobile communications apparatus including apparatus as claimed in claim 1, the communications apparatus being operable to select from one of a plurality of communications channels on the basis of their respective quality.

15. The apparatus of claim 1 wherein, when the quality data has a low value indicating good quality, said incorrect reception will increase said low value more rapidly than said correct reception will decrease said low value.

16. The apparatus of claim 1 wherein the quality data stored in the storage means is indicative of a history of said quality.

17. The method of claim 10 Wherein, when the quality data has a low value indicating good quality, said incorrect reception will increase said low value more rapidly than said correct reception will decrease said low value.

18. The method of claim 10, wherein the quality data is indicative of a history of the quality.

19. A device for determining quality of a communication channel carrying information units for reception, said device having:

a detector configured to identity correct or incorrect reception of said information units;

a memory configured to store quality data indicative of quality of the communication channel, said memory including a counter; and a controller coupled to said detector, said controller being configured to perform a first update operation to update the quality data in a first event of incorrect reception of said information units, and to perform a second update operation to update the quality data in a second event of correct reception of information units;

wherein the first update includes incrementing the counter by an amount obtained by subtracting a first portion of a value held in a byte of said counter from a predetermined amount immediately before the event.

20. The device of claim 11, wherein said first portion includes 100% of said value.

21. The device of claim 19, wherein the second update includes decrementing the counter by a second portion of said value.

22. The device of claim 21, wherein said second portion includes 100% of said value.

23. A device for determining quality of a communication channel carrying information units for reception, said device having:

a detector configured to identity correct or incorrect reception of said information units;

a memory configured to store quality data indicative of quality of the communication channel, said memory including a counter; and a controller coupled to said detector, said controller being configured to perform a first update operation to update the quality data in a first event of incorrect reception of said information units, and to perform a second update operation to update the quality data in a second event of correct reception of information units;

wherein the second update includes decrementing the counter by a first portion of a value held in a byte of said counter immediately before the event.

24. The device of claim 23, wherein said first portion includes 100% of said value.

25. The device of claim 23, wherein the first update includes incrementing the counter by an amount obtained by subtracting a second portion of said value from a predetermined amount.

26. The device of claim 25 wherein said second portion includes 100% of said value.

27. A method for determining the quality of a communications channel carrying information units for reception, said method comprising the steps of:

monitoring if correct reception of information transferred by the communications channel occurred;

storing quality data indicative of the quality of the communications channel in a memory including a counter; and performing a first update operation to update the quality data in a first event of incorrect reception of information units;

performing a second update operation to update the quality data in a second event of correct reception of information units;

wherein the first update includes incrementing the counter by an amount obtained by subtracting a first portion of a value held in a byte of said counter from a predetermined amount immediately before the event.

28. The method of claim 27, wherein said first portion includes 100% of said value.

29. The method of claim 27, wherein the second update includes decrementing the counter by a second portion of said value.

30. The device of claim 29, wherein said second portion includes 100% of said value.

31. A method for determining the quality of a communications channel carrying information units for reception, said method comprising the steps of:

monitoring if correct reception of information transferred by the communications channel occurred;

storing quality data indicative of the quality of the communications channel in a memory including a counter; and performing a first update operation to update the quality data in a first event of incorrect reception of information units;

performing a second update operation to update the quality data in a second event of correct reception of information units;

wherein the second update includes decrementing the counter by a first portion of a value held in a byte of said counter immediately before the event.

32. The device of claim 31, wherein said first portion includes 100% of said value.

33. The device of claim 31, wherein the first update includes incrementing the counter by an amount obtained by subtracting a second portion of said value from a predetermined amount.

34. The device of claim 33, wherein said second portion includes 100% of said value.

* * * * *